US012718289B2

(12) United States Patent
Kapur et al.

(10) Patent No.: US 12,718,289 B2
(45) **Date of Patent: *Aug. 25, 2026**

(54) ACCOUNT ESTABLISHMENT AND TRANSACTION MANAGEMENT USING BIOMETRICS AND INTELLIGENT RECOMMENDATION ENGINE

(71) Applicant: Bank of America Corporation, Charlotte, NC (US)

(72) Inventors: Monika Kapur, Jacksonville, FL (US); Jo-Ann Taylor, Godalming (GB); Jinna Kim, Charlotte, NC (US); Katherine Dintenfass, Lincoln, RI (US); Karen Lea MacQueen, Lyndhurst, OH (US); Jennifer T. Renckert, Middleburg, FL (US)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/380,483

(22) Filed: Oct. 16, 2023

(65) Prior Publication Data

US 2024/0037648 A1 Feb. 1, 2024

Related U.S. Application Data

(63) Continuation of application No. 17/411,978, filed on Aug. 25, 2021, now Pat. No. 11,803,898.

(51) Int. Cl.

*G06Q 40/02* (2023.01)
*G06F 21/32* (2013.01)

(Continued)

(52) U.S. Cl.

CPC ............. *G06Q 40/02* (2013.01); *G06F 21/32* (2013.01); *G06F 21/45* (2013.01); *G06Q 20/40145* (2013.01)

(58) Field of Classification Search

None

See application file for complete search history.

(56) References Cited

U.S. PATENT DOCUMENTS 6,957,770 B1 * 10/2005 Robinson ............... G06Q 20/40 235/382
7,269,737 B2 * 9/2007 Robinson ........... G06Q 20/3821 340/5.82

(Continued)

FOREIGN PATENT DOCUMENTS

WO 2012072651 A1 6/2012

OTHER PUBLICATIONS

Disclosed Anonymously, "Device Authentication by Continuous or Repeated Ambient Biometric Data Collection", An IP.com Prior Art Database Technical Disclosure; IP.com No. IPCOM000246655D IP.com Electronic Publication Date: Jun. 24, 2016. (Year: 2016).*

(Continued)

*Primary Examiner* — Mohammad Z Shaikh
(74) *Attorney, Agent, or Firm* — Banner & Witcoff, Ltd.

(57) ABSTRACT

Aspects of the disclosure relate to identity management and recommendation. A computing platform may receive a request to access information associated with one or more user accounts. The computing platform may send a biometric authentication prompt for identifying a user. The computing platform may receive biometric input of the user. The computing platform may retrieve one or more biometric enrollment templates from a database. The computing platform may compare the biometric input to the one or more biometric enrollment templates to determine if a match exists between the biometric input and one of the one or more biometric enrollment templates. Responsive to the user being authenticated based upon a match, the computing platform may retrieve and send information associated with the one or more user accounts. The computing platform may (Continued)

Identity Management And Recommendation Computing Platform 110
User Computing Device 120
Enterprise Server Infrastructure 130
Enterprise Data Storage Platform 140
221) Authenticate User
222) Transmit Verification
223) Identify Duress Information Associated With Biometric Input
224) Send Notification(s)/ Alert(s)

generate and send one or more recommendations associated with usage of the one or more user accounts.

19 Claims, 13 Drawing Sheets

(51) Int. Cl.
*G06F 21/45* (2013.01)
*G06Q 20/40* (2012.01)

(56) References Cited

U.S. PATENT DOCUMENTS 8,473,748 B2 * 6/2013 Sampas ............... H04W 12/068 713/182
8,527,213 B2 * 9/2013 Kailas .................... G16H 50/20 702/19
8,872,232 B2 * 10/2014 Imada .................. H10D 30/015 257/14
9,208,326 B1 * 12/2015 Gates .................... G06F 21/316
9,747,428 B2 * 8/2017 Tartz ....................... G06F 21/32
10,643,213 B1 * 5/2020 Bermudez .............. G06N 3/088
10,664,842 B1 * 5/2020 Bermudez .......... G06Q 20/4016
10,726,434 B2 * 7/2020 Jones-McFadden ......................... G06F 3/0481
11,483,309 B2 * 10/2022 Boncimino ........... G06F 16/532
11,587,055 B1 * 2/2023 Kalaboukis ...... G06Q 20/40145
11,636,482 B2 * 4/2023 Ravinathan .......... G06V 40/172 705/44
11,803,898 B2 * 10/2023 Kapur ..................... G06F 21/32
11,855,976 B2 * 12/2023 Chan ....................... H04L 63/20
11,861,645 B2 * 1/2024 Bermudez .............. G06N 3/045
11,922,447 B1 * 3/2024 Chiu .................. G06Q 30/0224
2003/0006277 A1 1/2003 Maskatiya et al.
2004/0015450 A1 1/2004 Zingher et al.
2005/0125338 A1 6/2005 Tidwell et al.
2006/0101508 A1 5/2006 Taylor
2007/0177770 A1 * 8/2007 Derchak .............. A61B 5/7267 382/115
2007/0288319 A1 12/2007 Robinson et al.
2008/0021794 A1 1/2008 Vega
2008/0086342 A1 4/2008 Curry et al.
2008/0290157 A1 11/2008 Robinson
2009/0112661 A1 4/2009 Mullen et al.
2010/0253470 A1 10/2010 Burke
2010/0299262 A1 11/2010 Handler
2010/0318461 A1 12/2010 Smith et al.
2011/0047628 A1 2/2011 Viars
2011/0087611 A1 * 4/2011 Chetal .................. G06Q 50/265 705/325
2011/0178909 A1 7/2011 Benefield et al.
2011/0208641 A1 8/2011 Shader et al.
2012/0191525 A1 7/2012 Singh et al.
2012/0233073 A1 9/2012 Salmon et al.
2013/0036058 A1 2/2013 Kelly et al.
2013/0074164 A1 3/2013 Bartlett
2013/0191194 A1 7/2013 Shreibati et al.
2013/0197991 A1 8/2013 Basu et al.
2013/0227664 A1 * 8/2013 McKay ................. H04L 9/3231 726/7
2013/0325716 A1 12/2013 Yeri et al.
2014/0129357 A1 5/2014 Goodwin
2014/0136419 A1 * 5/2014 Kiyohara ......... G06Q 20/40145 705/67
2014/0172687 A1 6/2014 Chirehdast
2014/0195416 A1 7/2014 Linscott et al.
2014/0214653 A1 7/2014 Rose et al.
2014/0304792 A1 * 10/2014 Derchak .............. A61B 5/6824 726/7
2015/0046241 A1 2/2015 Salmon et al.
2015/0113616 A1 * 4/2015 Sampas ............... H04L 63/0861 726/6
2015/0169832 A1 * 6/2015 Davis ................ H04M 1/72454 702/19
2015/0178804 A1 6/2015 Goad et al.
2016/0048914 A1 2/2016 Smith
2016/0162895 A1 6/2016 Nuzum et al.
2016/0180078 A1 * 6/2016 Chhabra ................ G06F 21/57 726/19
2016/0269411 A1 9/2016 Malachi
2017/0223017 A1 * 8/2017 Kohli ................. H04L 63/0853
2017/0262853 A1 9/2017 Williamson et al.
2017/0359351 A1 12/2017 Dintenfass et al.
2018/0075456 A1 * 3/2018 Just .................... G06Q 30/0601
2018/0089688 A1 * 3/2018 Kohli ................ G06Q 20/4016
2018/0121926 A1 5/2018 Sharma et al.
2018/0165662 A1 6/2018 Nam
2018/0174146 A1 * 6/2018 Bansal ............ G06Q 20/40145
2018/0205725 A1 7/2018 Cronkright et al.
2018/0211022 A1 7/2018 Wagner et al.
2018/0308100 A1 * 10/2018 Haukioja .............. G06N 20/00
2018/0374139 A1 12/2018 Shrivastava et al.
2019/0034934 A1 1/2019 Trelin et al.
2019/0050867 A1 2/2019 Van Os et al.
2019/0066114 A1 2/2019 Ross
2019/0087824 A1 3/2019 Glass, Jr.
2019/0122769 A1 4/2019 Wright et al.
2019/0199715 A1 6/2019 May
2019/0236612 A1 8/2019 Trelin et al.
2019/0378120 A1 12/2019 Berrod et al.
2020/0053076 A1 2/2020 Hassan et al.
2020/0065185 A1 2/2020 Mayer et al.
2020/0117780 A1 * 4/2020 Kaladgi ................. G06F 3/011
2020/0204546 A1 * 6/2020 Li .......................... G06V 40/15
2020/0228525 A1 * 7/2020 Boncimino ...... G06Q 20/40145
2020/0258088 A1 * 8/2020 Bermudez ........ G06Q 20/40145
2020/0351660 A1 11/2020 Avetisov et al.
2020/0357051 A1 11/2020 Hunt et al.
2020/0394638 A1 12/2020 Mcleod et al.
2021/0073804 A1 3/2021 Kikinis
2021/0097540 A1 4/2021 Sumpter et al.
2021/0097542 A1 4/2021 Khan et al.
2021/0142404 A1 5/2021 Kim et al.
2021/0157945 A1 5/2021 Cobb et al.
2021/0224663 A1 7/2021 Gil et al.
2021/0243181 A1 8/2021 Cronkright et al.
2021/0334798 A1 10/2021 Mossoba
2021/0334813 A1 * 10/2021 Clausen ........... G06Q 20/40145
2021/0397989 A1 12/2021 Mayers et al.
2021/0398131 A1 * 12/2021 Bermudez ........ G06Q 20/40145
2022/0029981 A1 1/2022 Mavani

OTHER PUBLICATIONS

Jinna, Kim, Unpublished U.S. Appl. No. 16/908,061, filed Jun. 22, 2020.
Apr. 14, 2023—(US) Non-Final Office Action—U.S. Appl. No. 17/396,215.
Yoonyee Pahk, et al., "COVALENT, a method for co-designing value exchange in community-centred design", School of Design and Human Engineering, Ulsan National Institute of Science and Technology (UNIST), Ulsan, South Korea, 2018, vol. 14, No. 4, pp. 275-292.
Dec. 23, 2022—(US) Final Office Action—U.S. Appl. No. 17/396,215.
Morioka et al., "From an ideal dream towards reality analysis: Proposing Sustainable Value Exchange Matrix (SVEM) from systematic literature review on sustainable business models and face validation", Journal of Cleaner Production, 2018.
Jul. 26, 2022—(US) Non-Final Office Action—U.S. Appl. No. 17/396,215.
Chiang et al., "The Performance Implications of Financial and Non-Financial Rewards: An Asian Nordic Comparison", Journal of Management Studies, 2011.
Oct. 27, 2022—(US) Non-Final Office Action—U.S. Appl. No. 17/411,978.
Mar. 30, 2022—(US) Non-Final Office Action—U.S. Appl. No. 17/411,978.

* cited by examiner

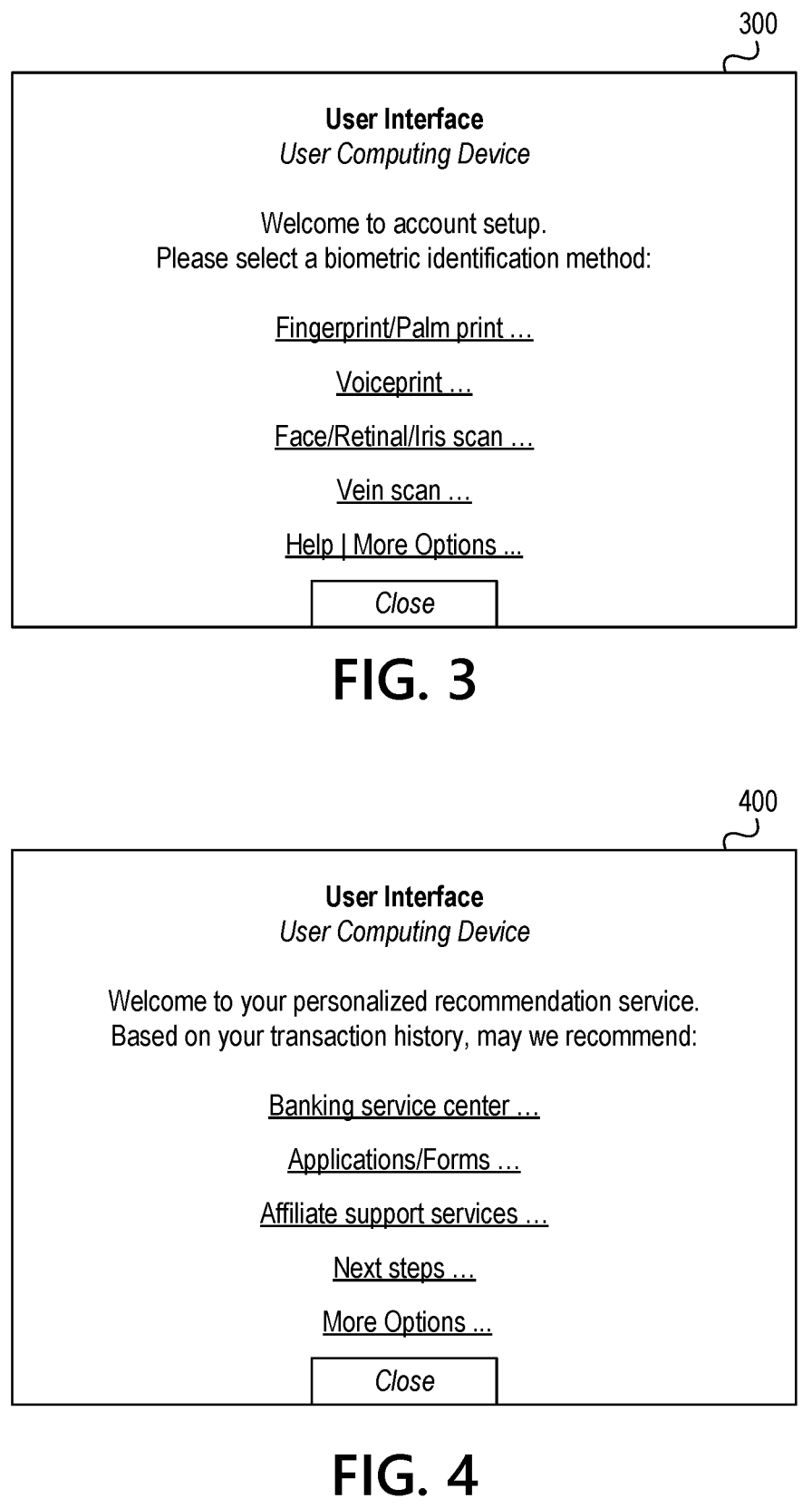

300

User Interface
*User Computing Device*

Welcome to account setup.
Please select a biometric identification method:

Fingerprint/Palm print ...

Voiceprint ...

Face/Retinal/Iris scan ...

Vein scan ...

Help | More Options ...

*Close*

User Interface
*User Computing Device*

Welcome to your personalized recommendation service.
Based on your transaction history, may we recommend:

Banking service center ...

Applications/Forms ...

Affiliate support services ...

Next steps ...

More Options ...

*Close*

FIG. 4

ACCOUNT ESTABLISHMENT AND TRANSACTION MANAGEMENT USING BIOMETRICS AND INTELLIGENT RECOMMENDATION ENGINE

The present application is a continuation of U.S. patent application Ser. No. 17/411,978, filed on Aug. 25, 2021. The above-identified application is incorporated by reference herein in its entirety.

BACKGROUND

Aspects of the disclosure generally relate to one or more computer systems, servers, and/or other devices including hardware and/or software. In particular, one or more aspects of the disclosure relate to identity management and personalized intelligent recommendation.

As we move to a cashless society, there are still many individuals who remain "unbanked" (e.g., lack access to a bank account). In many instances, an individual might not have sufficient identification, address, or other information required to open an account, or are unable to, or lack the knowledge to, manage their own account. As a result, the unbanked are often left to rely on costly alternative financial products and services (e.g., provided outside of traditional banking institutions). Also, in many instances, an individual, even if banked, might have difficulty remembering a personal identification (PIN), password, or the like, adding friction to the user experience. In addition, an individual, banked or unbanked, might be faced with an emergency or life event which might make it difficult or impossible to access identification documents. In any of these instances, such individuals may wish to use biometrics to establish an account or authorize a transaction. It may be difficult to use traditional tools to facilitate such transactions.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical problems associated with identity management. In accordance with one or more embodiments, a computing platform having at least one processor, a communication interface, and memory may receive a request from a computing device to access information associated with one or more user accounts. The computing platform may send a biometric authentication prompt to the computing device for identifying a user of the computing device. The computing platform may receive, from the computing device, biometric input of the user. The computing platform may retrieve one or more biometric enrollment templates from a database. The computing platform may compare the biometric input to the one or more biometric enrollment templates to determine if a match exists between the biometric input and one of the one or more biometric enrollment templates. The computing platform may authenticate the user based upon a match of the biometric input and one of the one or more biometric enrollment templates. Responsive to the user being authenticated using the biometric input, the computing platform may retrieve information associated with the one or more user accounts. The computing platform may send the information associated with the one or more user accounts to the computing device. The computing platform may generate, using a machine learning model, one or more recommendations associated with usage of the one or more user accounts. The computing platform may send the one or more recommendations to the computing device.

In some embodiments, the computing platform may receive biometric enrollment data of the user captured by a biometric sensor, generate a biometric enrollment template based on the biometric enrollment data, and transmit the biometric enrollment template for storage in association with one or more user accounts. In some arrangements, based on receiving the biometric enrollment data of the user, the computing platform may register an account for the user without requiring the user to provide additional identifying information.

In some examples, retrieving information associated with one or more user accounts may include transmitting a user identity verification to an enterprise server and retrieving the information associated with the user account from the enterprise server.

In some embodiments, the one or more user accounts may include an account for which the user is an authorized co-user.

In some example arrangements, the biometric authentication prompt is configured to prompt the user of a mobile device to provide biometric input via a biometric sensor integrated into the mobile device.

In some examples, receiving the biometric input of the user may include receiving hand-related features or head-related features of the user.

In some embodiments, receiving the biometric input of the user may include receiving one or more of: a fingerprint, a palm print, a voiceprint, a retinal scan, an iris scan, a face scan, or a vein scan of the user.

In some embodiments, the computing platform may receive, from the computing device, a second biometric input of the user to initiate a payment transaction associated with one or more user accounts; compare the second biometric input to the one or more biometric enrollment templates to determine if a match exists between the second biometric input and one of the one or more biometric enrollment templates; authenticate the user based upon a match of the second biometric input and one of the one or more biometric enrollment templates; and responsive to the user being authenticated using the second biometric input, transmit a notification may include a transaction verification to an enterprise server.

In some arrangements, the computing platform may process the biometric input to identify duress information associated with the biometric input of the user, and send one or more notifications based on the duress information. In some examples, sending the one or more notifications may include sending one or more alert messages to an enterprise server.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 3 and 4 depict example graphical user interfaces for identity management and intelligent recommendation in accordance with one or more example embodiments.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief introduction to the concepts described further herein, one or more aspects of the disclosure relate to facilitating the use of biometrics to establish an account or authorize payment. More specifically, in an emergency or following a life event, users, banked or unbanked, may rely on biometrics to gain access to financial accounts and/or receive personalized recommendations. By way of non-limiting examples, a user's home and property might be destroyed in an accident or natural disaster, a person may be forced to flee an area and/or part with their belongings, a person might not have a valid form of identification. In these and other such situations, users might not have or lack access to identification documents, but may instead provide their identity via biometrics to gain access to accounts or services. Due to the ability to quickly authorize a biometric input without necessarily requiring additional access credentials, a positive user experience may be provided. Additionally, preventing unauthorized users from accessing private or confidential information using biometrics, and in some cases preventing potentially unauthorized activity on a user account, further provides benefits to both account holders and enterprise organizations associated with the account. Other benefits and advantages will be appreciated with the benefit of the additional disclosures set forth below. Additional aspects of the disclosure allow unbanked or underbanked individuals (e.g., who might not have bank accounts or who use nonbank financial services, have limited options for banking in traditional financial institutions, or the like), to engage or gain access to various services of a financial institution. Further aspects of the disclosure may provide an identity management and recommendation computing platform for monitoring user activity, detecting trends, and generating recommendations (e.g. providing recommendations for next steps, such as directing users to resources and tools).

Figure 1A:
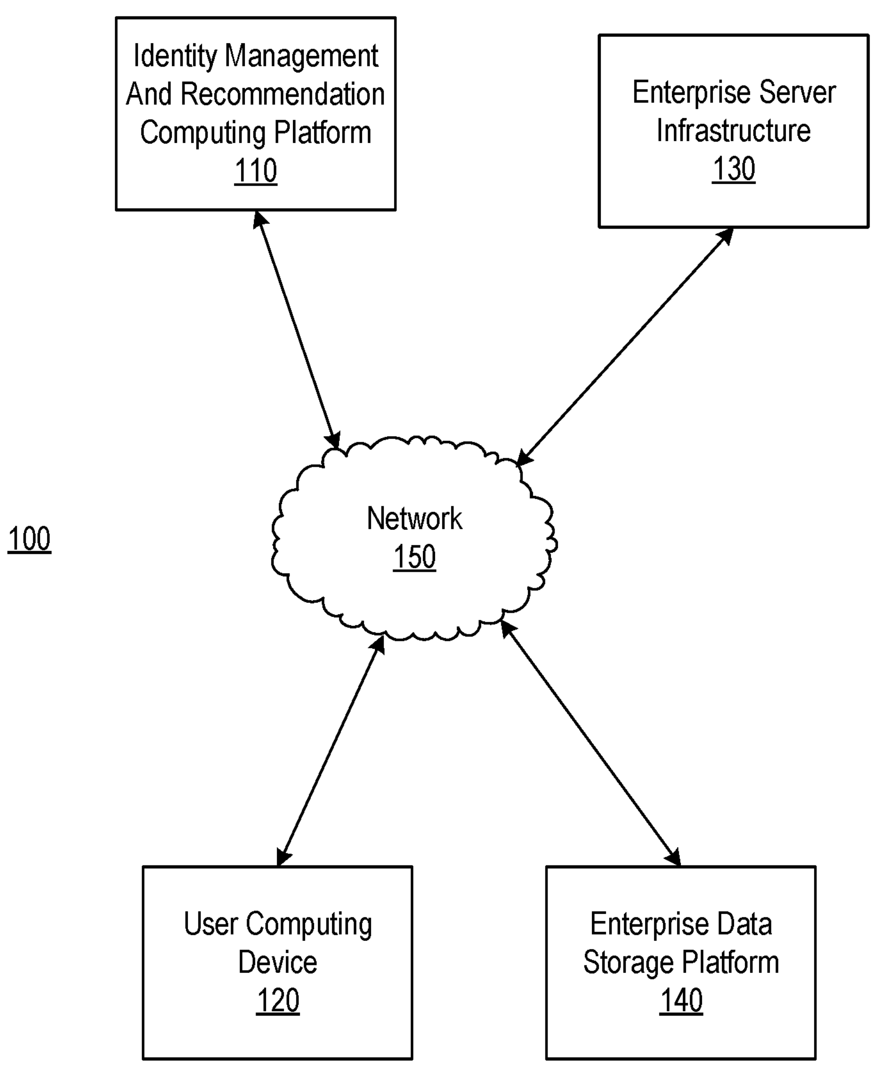
FIGS. 1A and 1B depict an illustrative computing environment for identity management and intelligent recommendation in accordance with one or more example embodiments.
Figure 1B:
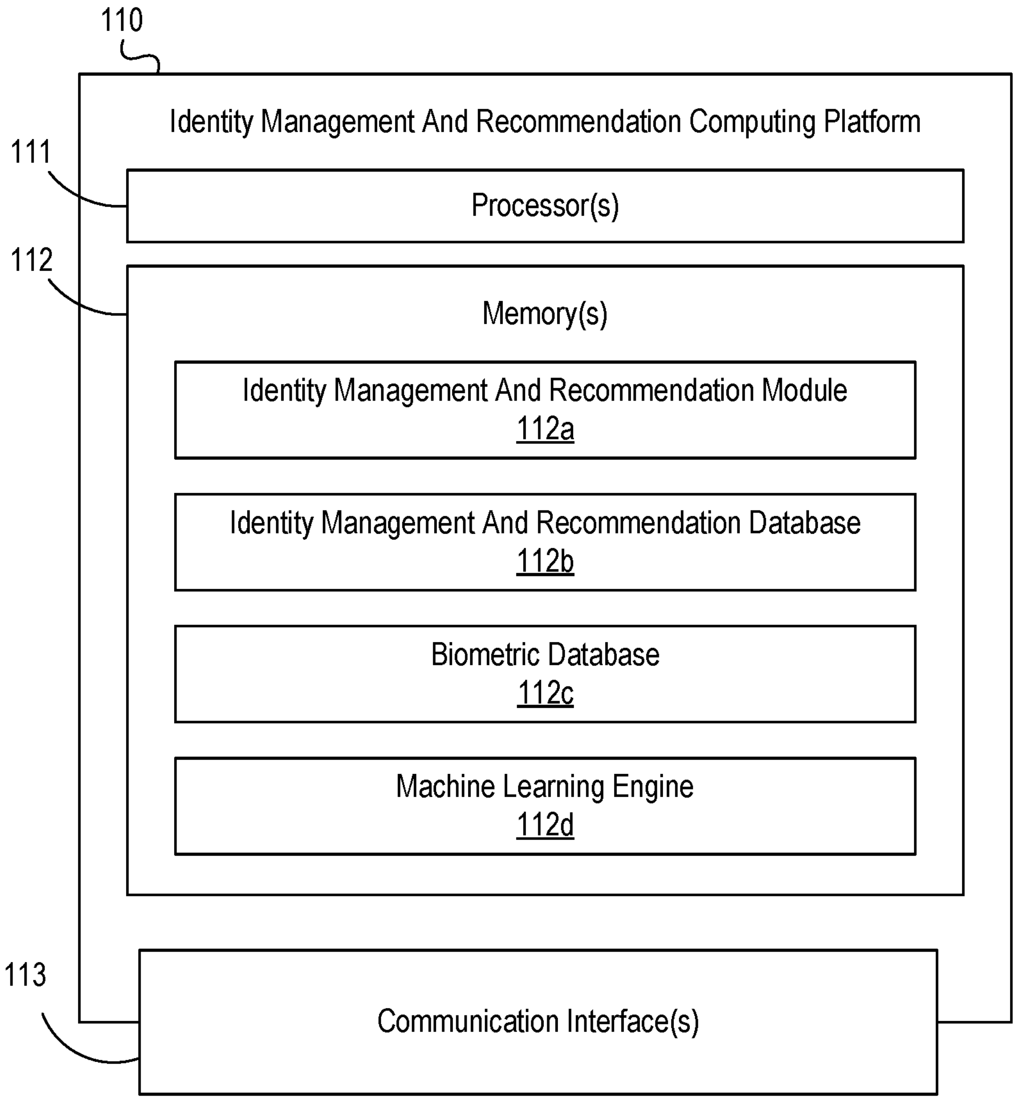

FIGS. 1A and 1B depict an illustrative computing environment for identity management and intelligent recommendation in accordance with one or more example embodiments. Referring to FIG. 1A, computing environment 100 may include one or more computing devices and/or other computing systems. For example, computing environment 100 may include identity management and recommendation computing platform 110, user computing device 120, enterprise server infrastructure 130, and enterprise data storage platform 140. Although one user computing device is shown for illustrative purposes, any number of user computing devices may be included without departing from the disclosure.

As illustrated in greater detail below, identity management and recommendation computing platform 110 may include one or more computing devices configured to perform one or more of the functions described herein. For example, identity management and recommendation computing platform 110 may include one or more computers (e.g., laptop computers, desktop computers, servers, server blades, or the like).

User computing device 120 may include one or more computing devices and/or other computer components (e.g., processors, memories, communication interfaces). In addition, and as illustrated in greater detail below, user computing device 120 may be configured to receive information from, send information to, and/or otherwise exchange information with one or more devices described herein. User computing device 120 may be equipped with a biometric sensor and may, among other functions, be configured to receive biometric inputs and to transmit biometric data to other devices as described herein.

User computing device 120 may be a mobile computing device (e.g., smartphone, tablet, smart watch, laptop computer, or the like) or desktop computing device (e.g., desktop computer, terminal, or the like) and/or may include a smart speaker or other related devices. In addition, user computing device 120 may be linked to and/or used by a first user (who may, e.g., be a customer of an enterprise organization (e.g., a financial institution) associated with enterprise server infrastructure 130 and enterprise data storage platform 140), but may also accessible to other users. User computing device 120 may be used to interact with an account for an enterprise organization (e.g., an online banking account, mobile banking application, or the like).

User computing device 120 may include one or more sensors for use in capturing or otherwise sensing biometric information of a user of user computing device 120. For example, user computing device 120 may include one or more sensors within the device and one or more sensors externally connected to user computing device 120, such as biometric sensors which may be communicatively coupled to user computing device 120 via an I/O port. User computing device 120 may further include one or more of an audio input (e.g., a microphone), a fingerprint sensor, a camera (e.g., a still camera, a video camera, an infrared/biometric camera, and the like), and/or a location sensor (e.g., a GPS device, a triangulation device such as a telecommunications modem, and the like).

Enterprise server infrastructure 130 may include one or more computing devices and/or other computer components (e.g., processors, memories, communication interfaces). In addition, and as illustrated in greater detail below, enterprise server infrastructure 130 may be configured to host, execute, and/or otherwise provide one or more enterprise applications. Enterprise server infrastructure 130 may also be configured to receive information from, send information to, and/or otherwise exchange information with one or more devices as described herein. The location where enterprise server infrastructure 130 is deployed may be remote from identity management and recommendation computing platform 110 and/or user computing device 120.

For example, enterprise server infrastructure 130 may be configured to host, execute, and/or otherwise provide one or more speech processing programs, machine learning models, an enterprise mobile application for user devices, and/or other programs associated with an enterprise server. In some instances, enterprise server infrastructure 130 may be configured to provide various enterprise and/or back-office computing functions for an enterprise organization, such as a financial institution. For example, enterprise server infrastructure 130 may include various servers and/or databases that store and/or otherwise maintain account information, such as financial account information including account balances, transaction history, account owner information, and/or other information. In addition, enterprise server infrastructure 130 may process and/or otherwise execute tasks on specific accounts based on commands and/or other information received from other computer systems included in computing environment 100. Additionally, or alternatively, enterprise server infrastructure 130 may receive instructions from identity management and recommendation computing platform 110 and then execute those instructions.

In some examples, enterprise server infrastructure 130 may be a component of a banking system. The banking system may include a customer database and various communication portals that provide access to the banking system. The communication portals of the banking system serve as entry points into the banking system to receive communications from a remote location, such as user computing device 120. The banking system may also include different types of communication portals to allow individuals to access the banking system using different types of devices. In some instances, the banking system may include an interactive voice response (IVR) portal, a mobile portal, and/or an online portal to facilitate communications with the banking system.

Enterprise data storage platform 140 may include one or more computing devices and/or other computer components (e.g., processors, memories, communication interfaces). In addition, and as illustrated in greater detail below, enterprise data storage platform 140 may be configured to receive information from, send information to, and/or otherwise exchange information with one or more devices as described herein. The location where enterprise data storage platform 140 is deployed may be remote from identity management and recommendation computing platform 110 and/or user computing device 120 and/or enterprise server infrastructure 130. In addition, and as illustrated in greater detail below, enterprise data storage platform 140 may be configured to store and/or otherwise maintain enterprise data. Additionally, or alternatively, enterprise server infrastructure 130 may be configured to store and/or otherwise maintain enterprise data. For example, enterprise server infrastructure 130 may be configured to store and/or otherwise maintain task templates associated with users, historical data related to users, biometric identifiers associated with users, behavioral identifiers associated with users, location data of computing devices, and so forth. Additionally, or alternatively, enterprise server infrastructure 130 may load data from enterprise data storage platform 140, manipulate and/or otherwise process such data, and return modified data and/or other data to enterprise data storage platform 140 and/or to other computer systems included in computing environment 100.

In some embodiments, enterprise data storage platform 140 may store customer profiles. The customer profiles may include customer information relating to an enterprise organization customer. Customer information may include, for example, the name of the customer, contact information for the customer, and account information for the customer. Customer information may also include information that the enterprise organization may utilize to determine the identity or authenticate an individual such as biometric identifying information, answers to security questions, phone numbers or one or more network addresses from which the individual previously contacted the enterprise organization, device identification numbers of devices the individual has previously used to contact the enterprise organization, and other types of information that may be utilized to identify or authenticate an individual. Customer information may include other types of information related to enterprise organization customers.

Computing environment 100 also may include one or more networks, which may interconnect one or more of identity management and recommendation computing platform 110, user computing device 120, enterprise server infrastructure 130, and enterprise data storage platform 140. For example, computing environment 100 may include network 150. Network 150 may include one or more sub-networks (e.g., local area networks (LANs), wide area networks (WANs), or the like). For example, network 150 may include a private sub-network that may be associated with a particular organization (e.g., a corporation, financial institution, educational institution, governmental institution, or the like) and that may interconnect one or more computing devices associated with the organization. For example, identity management and recommendation computing platform 110, enterprise server infrastructure 130, and enterprise data storage platform 140 may be associated with an organization (e.g., a financial institution), and network 150 may be associated with and/or operated by the organization, and may include one or more networks (e.g., LANs, WANs, virtual private networks (VPNs), or the like) that interconnect identity management and recommendation computing platform 110, enterprise server infrastructure 130, and enterprise data storage platform 140. Network 150 also may include a public sub-network that may connect the private sub-network and/or one or more computing devices connected thereto (e.g., identity management and recommendation computing platform 110, enterprise server infrastructure 130, enterprise data storage platform 140) with one or more networks and/or computing devices that are not associated with the organization (e.g., user computing device 120).

In one or more arrangements, identity management and recommendation computing platform 110, user computing device 120, enterprise server infrastructure 130, and enterprise data storage platform 140 may be any type of computing device capable of receiving a user interface, receiving input via the user interface, and communicating the received input to one or more other computing devices. For example, identity management and recommendation computing platform 110, user computing device 120, enterprise server infrastructure 130, enterprise data storage platform 140, and/or the other systems included in computing environment 100 may, in some instances, include one or more processors, memories, communication interfaces, storage devices, and/or other components. As noted above, and as illustrated in greater detail below, any and/or all of the computing devices included in computing environment 100 may, in some instances, be special-purpose computing devices configured to perform specific functions.

Referring to FIG. 1B, identity management and recommendation computing platform 110 may include one or more processor(s) 111, memory(s) 112, and communication interface(s) 113. A data bus may interconnect processor 111, memory 112, and communication interface 113. Communication interface 113 may be a network interface configured to support communication between identity management and recommendation computing platform 110 and one or more networks (e.g., network 150 or the like). Memory 112 may include one or more program modules having instructions that when executed by processor 111 cause identity management and recommendation computing platform 110 to perform one or more functions described herein and/or one or more databases and/or other libraries that may store and/or otherwise maintain information which may be used by such program modules and/or processor 111.

In some instances, the one or more program modules and/or databases may be stored by and/or maintained in different memory units of identity management and recommendation computing platform 110 and/or by different computing devices that may form and/or otherwise make up identity management and recommendation computing platform 110. For example, memory 112 may have, store, and/or include an identity management and recommendation module 112*a*, an identity management and recommendation database 112*b*, a biometrics database 112*c*, and a machine learning engine 112*d*. Identity management and recommendation module 112*a* may have instructions that direct and/or cause identity management and recommendation computing platform 110 to perform identity management and generate recommendations and/or perform other functions, as discussed in greater detail below. Identity management and recommendation database 112*b* may store information used by identity management and recommendation module 112*a* and/or identity management and recommendation computing platform 110 in performing identity management and generating recommendations and/or in performing other functions. Biometric database 112*c* may store biometric information (e.g., biometric enrollment templates) used by identity management and recommendation module 112*a* and/or identity management and recommendation computing platform 110 in conducting identity management and generating recommendations and/or in performing other functions. Machine learning engine 112*d* may have instructions that direct and/or cause identity management and recommendation computing platform 110 to set, define, and/or iteratively redefine rules, techniques and/or other parameters used by identity management and recommendation computing platform 110 and/or other systems in computing environment 100 in performing identity management and generating recommendations using machine learning.

Figure 2A:
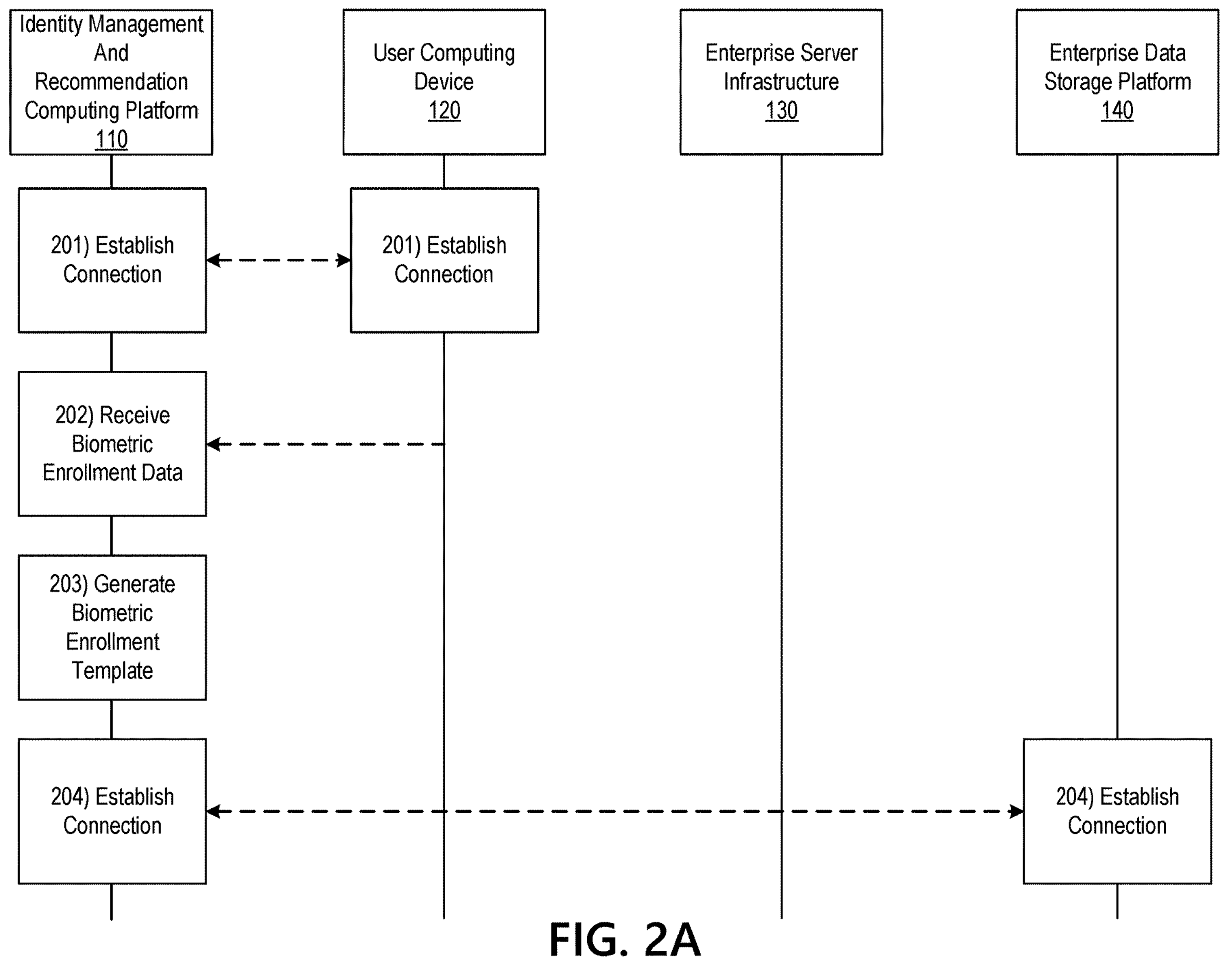
FIGS. 2A-2I depict an illustrative event sequence for identity management and intelligent recommendation in accordance with one or more example embodiments.

FIGS. 2A-2I depict an illustrative event sequence for identity management and intelligent recommendation in accordance with one or more example embodiments. Referring to FIG. 2A, at step 201, a user of a computing device (e.g., user computing device 120) may establish a connection with identity management and recommendation computing platform 110. For example, the user of the computing device (e.g., user computing device 120) may establish a first wireless data connection with identity management and recommendation computing platform 110 to link identity management and recommendation computing platform 110 with the user of the computing device (e.g., user computing device 120) (e.g., in preparation for sending biometric data or sending requests). In some instances, the user of the computing device (e.g., user computing device 120) may identify whether or not a connection is already established with identity management and recommendation computing platform 110. If a connection is already established with identity management and recommendation computing platform 110, the user of the computing device (e.g., user computing device 120) might not re-establish the connection. If a connection is not yet established with identity management and recommendation computing platform 110, the user of the computing device (e.g., user computing device 120) may establish the first wireless data connection as described above.

In some embodiments, an enrollment process may be implemented at steps 201 to 205 (e.g., to establish stored biometric data). At step 202, identity management and recommendation computing platform 110 may receive, via the communication interface (e.g., communication interface 113) and while the first wireless data connection is established, biometric enrollment data (e.g., a biometric sample) of the user captured by one or more sensors. For example, one or more biometric sensors (e.g., a fingerprint sensor, a camera, and/or other such sensors that may be capable of capturing biometric information) may be configured to capture a fingerprint, a palm print, a voiceprint, a retinal scan, an iris scan, a face scan, a vein scan, and/or the like, of the user. In some examples, the biometric enrollment data may include a finger tapping sequence, a blinking sequence, mouthing of a word, head movement, and/or the like. At step 203, identity management and recommendation computing platform 110 may generate a biometric enrollment template based on the biometric enrollment data. In some examples, the biometric enrollment template may be and/or include a digital representation (e.g., a digital reference) of the distinct features or characteristics extracted from the biometric sample (e.g., raw data) captured by the one or more sensors.

At step 204, identity management and recommendation computing platform 110 may establish a connection with enterprise data storage platform 140. For example, identity management and recommendation computing platform 110 may establish a second wireless data connection with enterprise data storage platform 140 to link identity management and recommendation computing platform 110 with enterprise data storage platform 140. In some instances, identity management and recommendation computing platform 110 may identify whether or not a connection is already established with enterprise data storage platform 140. If a connection is already established with enterprise data storage platform 140, identity management and recommendation computing platform 110 might not re-establish the connection. If a connection is not yet established with the enterprise data storage platform 140, identity management and recommendation computing platform 110 may establish the second wireless data connection as described above.

Figure 2B:
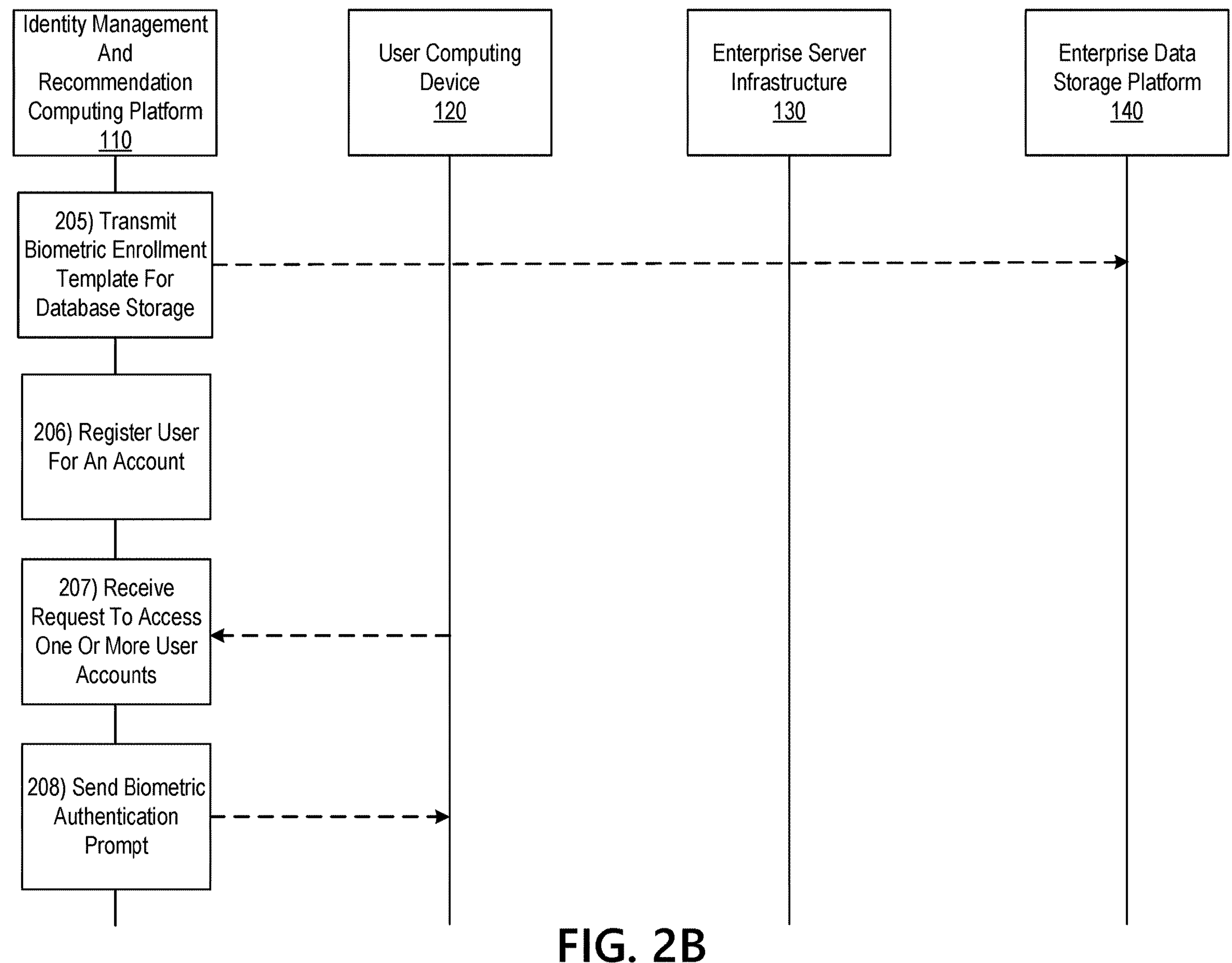

Referring to FIG. 2B, at step 205, identity management and recommendation computing platform 110 may transmit, via the communication interface (e.g., communication interface 113) and while the second wireless data connection is established, the biometric enrollment template for storage in association with one or more user accounts. For example, the biometric enrollment template may be transmitted for storage in a biometric database. As shown in FIG. 1B, biometric database 112*c* may be part of the identity management and recommendation computing platform 110. In other examples, the biometric database may be located in enterprise data storage platform 140. Still in other examples, the biometric database may be located in various other locations without departing from the scope of the present disclosure, including but not limited to enterprise server infrastructure 130. In some examples, the enrollment process may be repeated one or more times to continue to refine and update the biometrics enrollment template.

At step 206, based on receiving the biometric enrollment data of the user, identity management and recommendation computing platform 110 may register an account for the user. For example, identity management and recommendation computing platform 110 may store the user's information, including provided biometric information, in a database of all registered users. In some embodiments, identity management and recommendation computing platform 110 may register an account for the user without requiring the user to provide additional identifying information (e.g., biometrics alone may allow a user to establish an account). For instance, the user might not be required to provide identifying information generally required for opening an account, which may include multiple forms of photo identification, a unique numerical identifier, a current residential address, contact information (e.g., name, address, phone number, email address), and/or proof of residency.

In some arrangements, identity management and recommendation computing platform 110 may cause the user computing device (e.g., user computing device 120) to display and/or otherwise present one or more graphical user interfaces similar to graphical user interface 300, which is illustrated in FIG. 3. As seen in FIG. 3, graphical user interface 300 may include text and/or other information associated with establishing an account using biometrics, including one or more user-selectable options that allow a user to select from one or more methods of biometric identification (e.g., "Welcome to account setup. Please select a biometric identification method. [Fingerprint/Palm print . . . ] [Voiceprint . . . ] [Face/Retinal/Iris Scan . . . ] [Vein Scan . . . ]"). It will be appreciated that other and/or different notifications may also be provided.

In some instances, identity management and recommendation computing platform 110 may identify whether or not an account associated with the user is already established with an enterprise organization (e.g., a financial institution). If an account associated with the user is already established with an enterprise organization, identity management and recommendation computing platform 110 might not establish another account and allow the user to proceed with transactions using one or more existing accounts. If an account is not yet established with an enterprise organization (e.g., a financial institution), identity management and recommendation computing platform 110 may establish the account as described above.

In some embodiments, at step 207, identity management and recommendation computing platform 110 may receive, via the communication interface (e.g., communication interface 113) and while the first wireless data connection is established, from a computing device, a request to access information associated with one or more user accounts. In some examples, the one or more user accounts may include an account (e.g., other than the user's account) for which the user is an authorized co-user.

At step 208, identity management and recommendation computing platform 110 may send, via the communication interface (e.g., communication interface 113) and while the first wireless data connection is established, to the computing device (e.g., user computing device 120), a biometric authentication prompt for identifying a user of the computing device (e.g., user of user computing device 120). In some examples, the biometric authentication prompt may be configured to prompt the user of a mobile device to provide biometric input via a biometric sensor integrated into the mobile device. For instance, identity management and recommendation computing platform 110 may cause a push notification service to send a push notification to the mobile device.

Figure 2C:
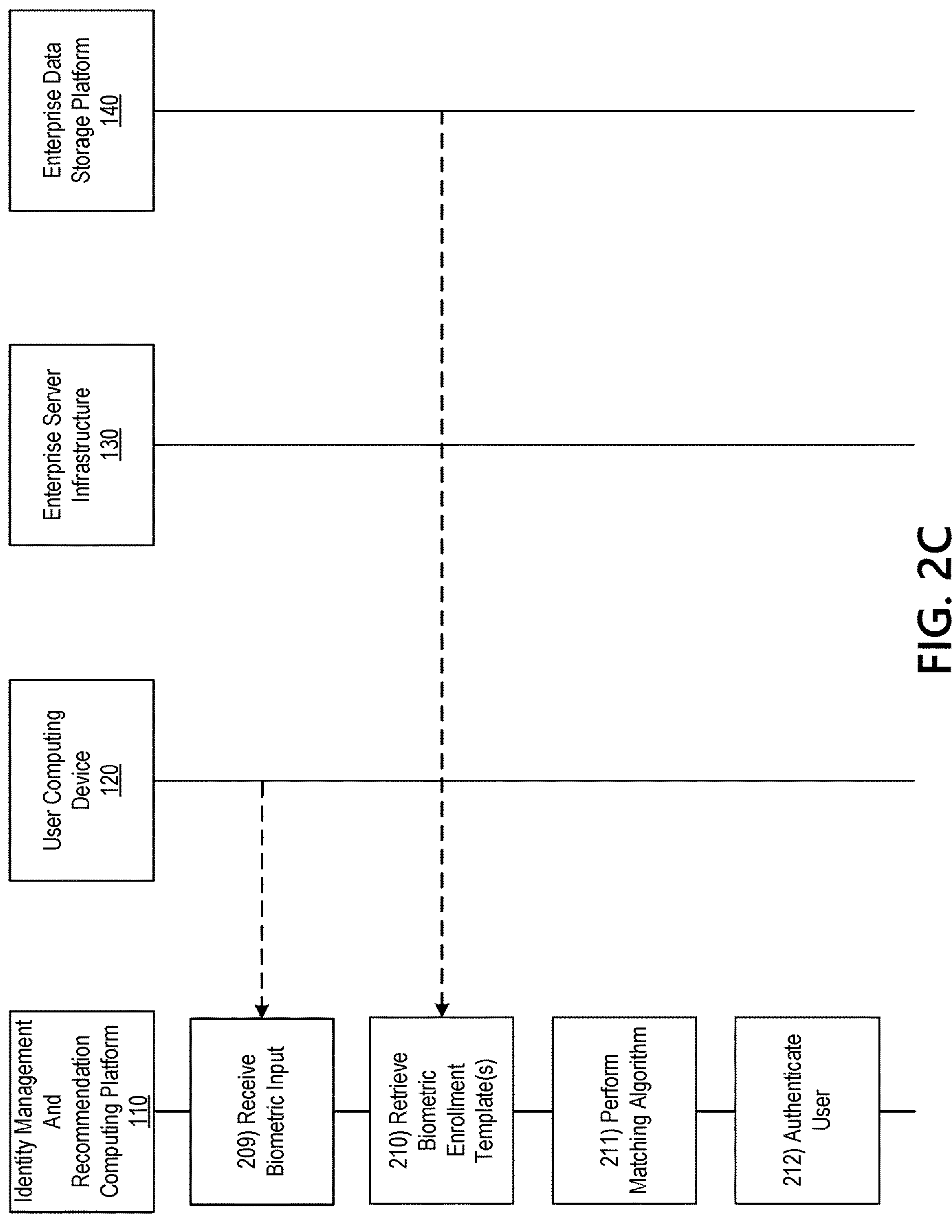

Referring to FIG. 2C, at step 209, identity management and recommendation computing platform 110 may receive, from the computing device (e.g., user computing device 120), biometric input of the user. In some examples, the biometric input of the user may include receiving hand-related features or head-related features of the user. For instance, the biometric input of the user may include one or more of: a fingerprint, a palm print, a voiceprint, a retinal scan, an iris scan, a face scan, or a vein scan of the user.

At step 210, identity management and recommendation computing platform 110 may retrieve one or more biometric enrollment templates from a database. As described above, the database may be biometric database 112*c*. Still in other examples, the biometric database may be located in various other locations without departing from the scope of the present disclosure, including but not limited to enterprise server infrastructure 130, and/or enterprise data storage platform 140.

At step 211, identity management and recommendation computing platform 110 may perform a matching algorithm. For example, identity management and recommendation computing platform 110 may apply a matching algorithm to compare the biometric input to the one or more biometric enrollment templates to determine if a match exists between the biometric input and one of the one or more biometric enrollment templates. In some instances, the matching algorithm may take into account a number of features regarding the biometric input, such as a confidence interval associated with the biometric input. In some examples the matching algorithm may determine a relative match amount or relative match percentage to quantify a degree to which the biometric input and the one or more biometric enrollment templates match. The relative match amount or relative match percentage may be compared to a match threshold to determine if the biometric input sufficiently matches the one or more biometric enrollment templates. At step 212, identity management and recommendation computing platform 110 may authenticate the user based upon a match of the biometric input and one of the one or more biometric enrollment templates.

Figure 2D:
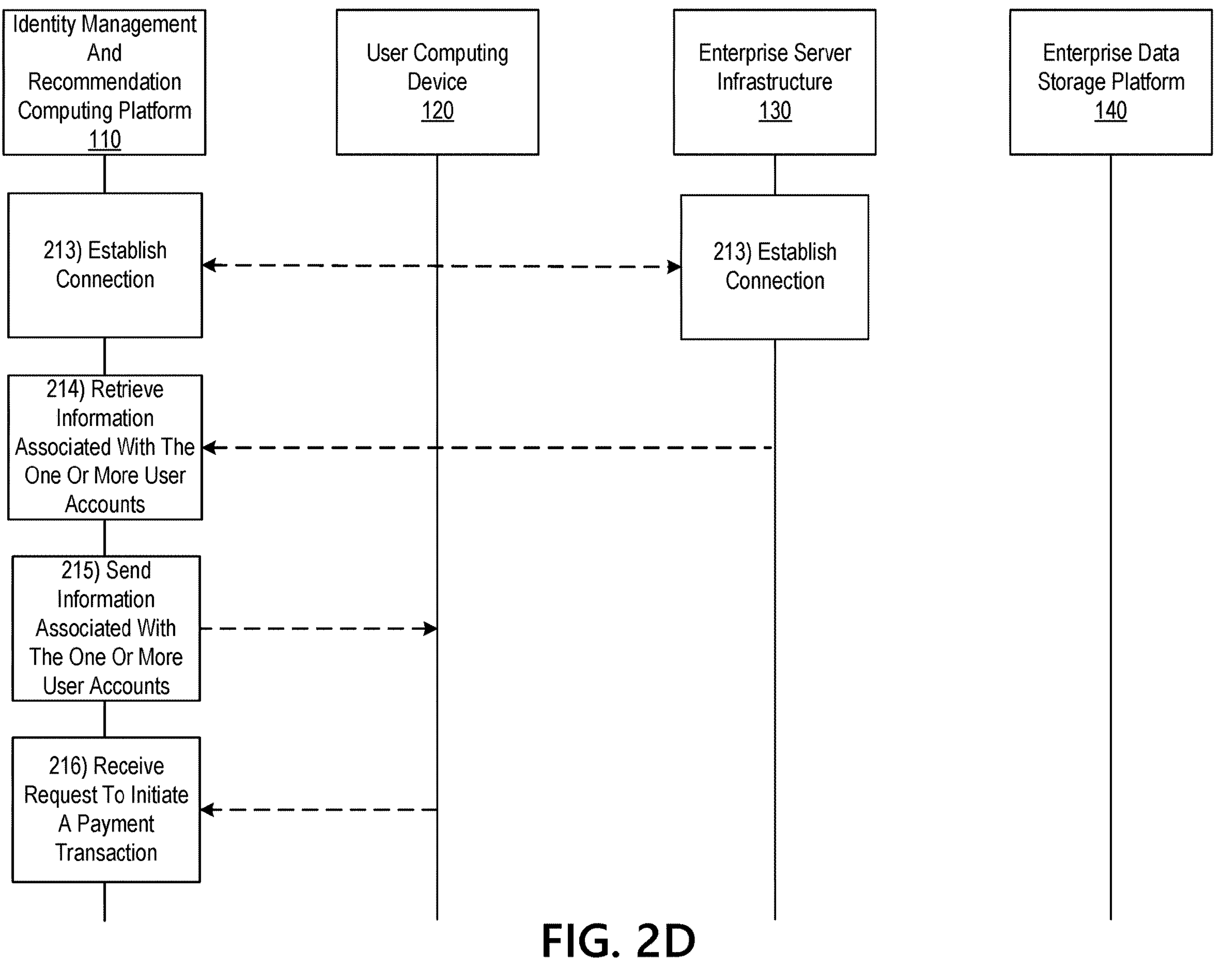

With reference to FIG. 2D, at step 213, identity management and recommendation computing platform 110 may establish a connection with enterprise server infrastructure 130. For example, identity management and recommendation computing platform 110 may establish a third wireless data connection with enterprise server infrastructure 130 to link identity management and recommendation computing platform 110 with enterprise server infrastructure 130. In some instances, identity management and recommendation computing platform 110 may identify whether or not a connection is already established with the enterprise server infrastructure 130. If a connection is already established with enterprise server infrastructure 130, identity management and recommendation computing platform 110 might not re-establish the connection. If a connection is not yet established with enterprise server infrastructure 130, identity management and recommendation computing platform 110 may establish the third wireless data connection as described above.

At step 214, responsive to the user being authenticated using the biometric input, identity management and recommendation computing platform 110 may retrieve information associated with the one or more user accounts. In some embodiments, identity management and recommendation computing platform 110 may identify all accounts capable of conducting transactions for the recipient. In some examples, identity management and recommendation computing platform 110 may identify accounts at a single financial institution. In other examples, identity management and recommendation computing platform 110 may identify multiple accounts over different financial institutions. In retrieving information associated with one or more user accounts, identity management and recommendation computing platform 110 may transmit a user identity verification to an enterprise server (e.g., enterprise server infrastructure 130), for instance, to verify that the user of the computing device (e.g., user of user computing device 120) is authorized to access specific data or services, and retrieve the information associated with the user account from the enterprise server (e.g., enterprise server infrastructure 130).

At step 215, identity management and recommendation computing platform 110 may send, via the communication interface (e.g., communication interface 113) and while the first wireless data connection is established, the information associated with the one or more user accounts to the computing device (e.g., user computing device 120). In this way, based on identifying a user via biometrics, identity management and recommendation computing platform 110 may quickly determine accounts for which the user is allowed access to, and accounts for which the user may be an associate of, without cumbersome steps or significant costs (e.g., the user need not specify details such as which exact account they are trying to access, who the main account holder is, etc.).

In some embodiments, at step 216, identity management and recommendation computing platform 110 may receive, via the communication interface (e.g., communication interface 113) and while the first wireless data connection is established, from a computing device, a request to initiate a payment transaction associated with one or more user accounts.

Figure 2E:
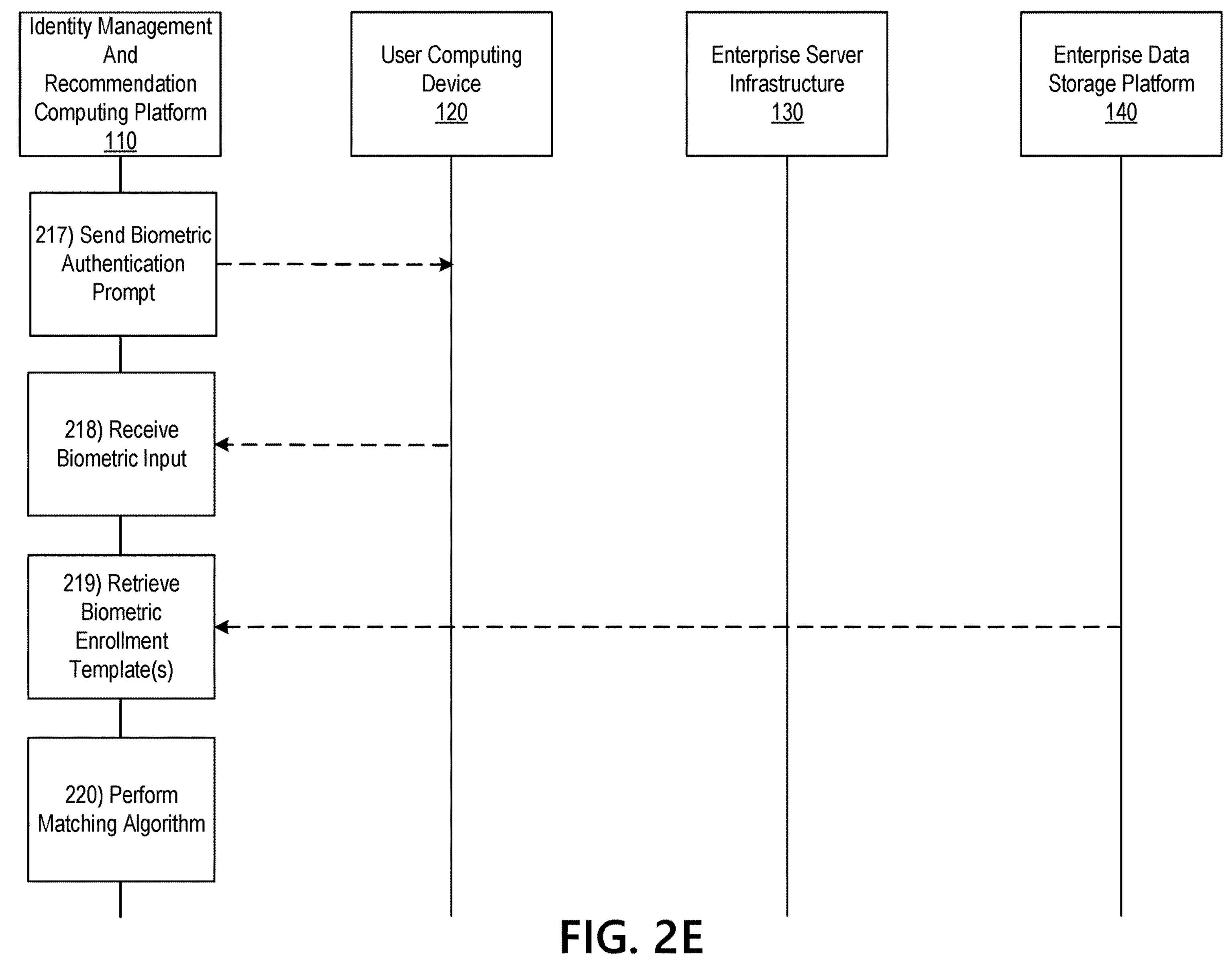

Referring to FIG. 2E, at step 217, identity management and recommendation computing platform 110 may send, via the communication interface (e.g., communication interface 113) and while the first wireless data connection is established, to the computing device (e.g., user computing device 120), a biometric authentication prompt for identifying the user of the computing device (e.g., user of user computing device 120). In some examples, the biometric authentication prompt may be configured to prompt the user of a mobile device to provide biometric input via a biometric sensor integrated into the mobile device. For instance, identity management and recommendation computing platform 110 may cause a push notification service to send a push notification to the mobile device.

At step 218, identity management and recommendation computing platform 110 may receive, from the computing device (e.g., user computing device 120), biometric input of the user. In some examples, the biometric input of the user may include receiving hand-related features or head-related features of the user. For instance, the biometric input of the user may include one or more of: a fingerprint, a palm print, a voiceprint, a retinal scan, an iris scan, a face scan, or a vein scan of the user.

At step 219, identity management and recommendation computing platform 110 may retrieve one or more biometric enrollment templates from a database. As described above, the database may be biometric database 112*c*. Still in other examples, the biometric database may be located in various other locations without departing from the scope of the present disclosure, including but not limited to enterprise server infrastructure 130, and/or enterprise data storage platform 140.

At step 220, identity management and recommendation computing platform 110 may perform a matching algorithm. For example, identity management and recommendation computing platform 110 may apply a matching algorithm to compare the biometric input to the one or more biometric enrollment templates to determine if a match exists between the biometric input and one of the one or more biometric enrollment templates. In some instances, the matching algorithm may take into account a number of features regarding the biometric input, such as a confidence interval associated with the biometric input. In some examples the matching algorithm may determine a relative match amount or relative match percentage to quantify a degree to which the biometric input and the one or more biometric enrollment templates match. The relative match amount or relative match percentage may be compared to a match threshold to determine if the biometric input sufficiently matches the one or more biometric enrollment templates.

Figure 2F:
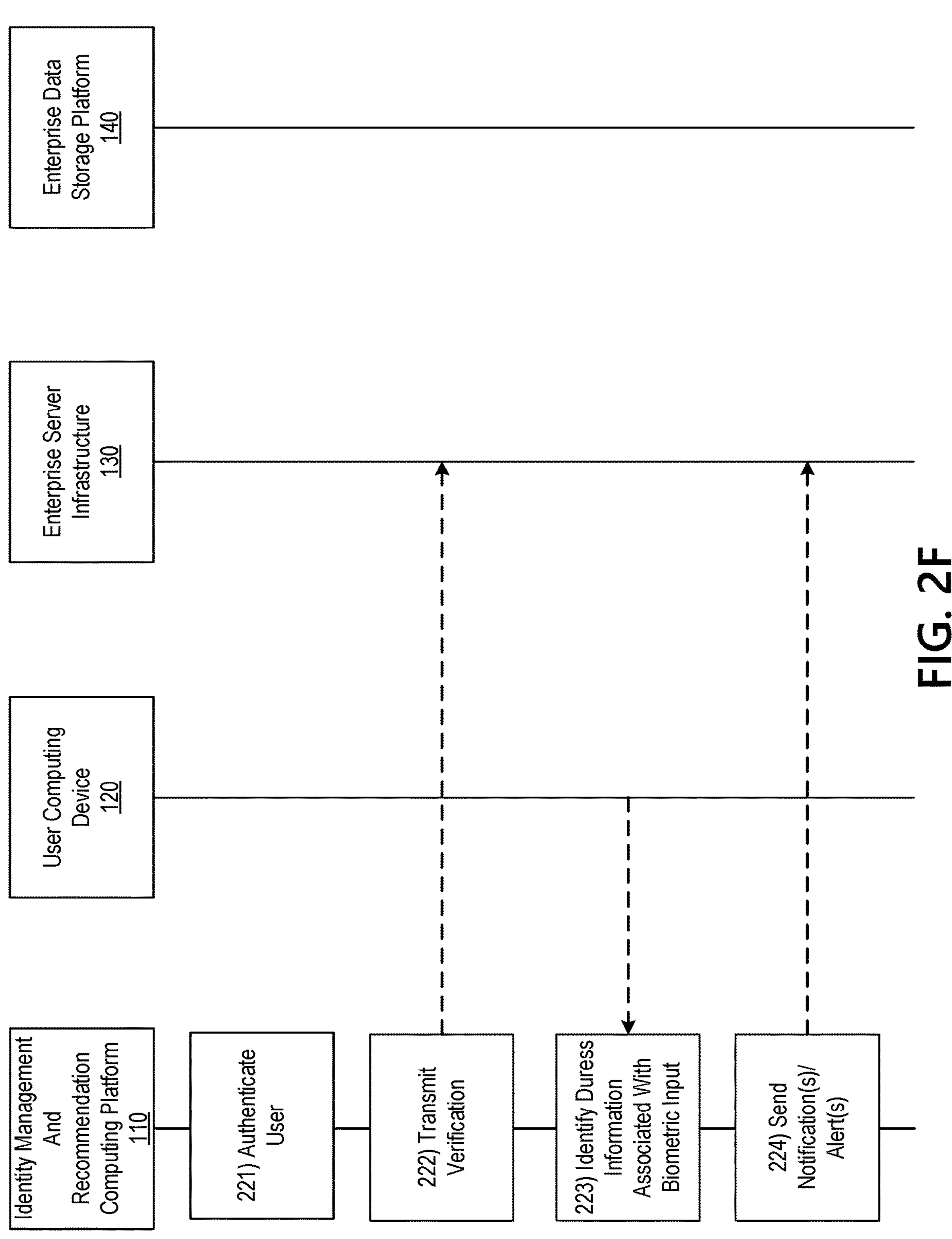
Figure 2G:
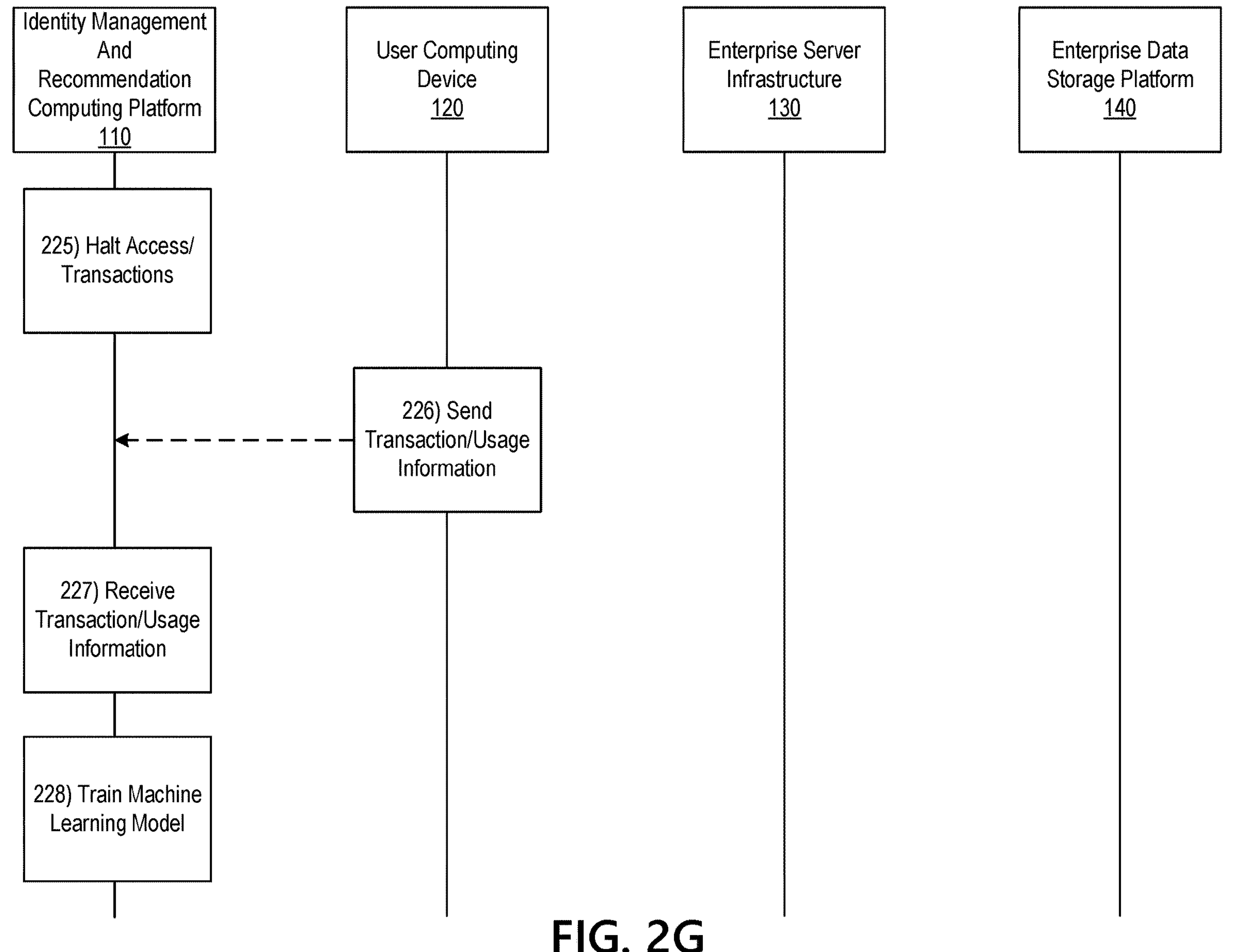

Referring to FIG. 2F, at step 221, identity management and recommendation computing platform 110 may authenticate the user based upon a match of the biometric input and one of the one or more biometric enrollment templates. At step 222, responsive to the user being authenticated using the biometric input, identity management and recommendation computing platform 110 may send, via the communication interface (e.g., communication interface 113) and while the third wireless data connection is established, a notification comprising a transaction verification to an enterprise server (e.g., authorize a payment transaction using one or more accounts). In some arrangements, biometrics may be combined with a card (e.g., a physical card) to make a payment, and in other arrangements, biometrics alone may allow a user to pay (e.g., without the card).

In some embodiments, at step 223, identity management and recommendation computing platform 110 may process the biometric input (e.g., received at step 209, 218) to identify (e.g., detect) duress information associated with the biometric input of the user. In some examples, identity management and recommendation computing platform 110 may, using artificial intelligence and/or machine learning, recognize biometric stress indicators such as dilated pupils, fast breathing, facial tension, stiff posture, increased voice pitch, and/or the like. In some examples, during an enrollment process (e.g., at steps 201 through 205), a user of a computing device (e.g., user computing device 120) may choose to provide (e.g., register) alternate biometric configurations (e.g., an alternate blinking or finger tapping sequence) that may be used to indicate that the user is under duress. This alternate biometric configuration may be transmitted to identity management and recommendation computing platform 110 to covertly signal that the user is under duress and that help is needed.

At step 224, based on the identified duress information, identity management and recommendation computing platform 110 may generate and send, via the communication interface (e.g., communication interface 113) and while the third wireless data connection is established, one or more notifications. For example, identity management and recommendation computing platform 110 may send one or more alert messages to an enterprise server (e.g., enterprise server infrastructure) and/or trigger a response (e.g., freeze accounts, dial emergency services). In turn, referring to FIG. 2G, at step 225, identity management and recommendation computing platform 110 may halt or terminate a pending operation requiring biometric authentication. For instance, identity management and recommendation computing platform 110 may halt or terminate access operations requested at step 207 (e.g., for retrieving information associated with the one or more accounts) or transaction operations requested at step 216 (e.g., for payment transactions associated with the one or more accounts).

At steps 226 to 227, identity management and recommendation computing platform 110 may monitor transaction and usage associated with one or more user accounts (e.g., one or more accounts associated with the user of user computing device 120). For example, at step 226, user computing device 120 may send historical transaction/usage information to identity management and recommendation computing platform 110. For example, user computing device 120 may send historical transaction/usage information to identity management and recommendation computing platform 110 while the first wireless data connection is established.

In some instances, in sending the historical transaction/usage information, user computing device 120 may send prior transaction requests, usage data, determinations of asset/liability account and balances associated with the user computing device 120, and/or other information. In some instances, the prior transaction requests or usage data may include commercial transactions, currency transfers, and/or other activities. In some instances, the prior transactions/usage may have been made by the user via the user computing device 120 and/or a banking device, mobile device, application, and/or other methods.

At step 227, identity management and recommendation computing platform 110 may receive the historical transaction/usage information from user computing device 120. For example, identity management and recommendation computing platform 110 may receive the historical transaction/usage information via the communication interface 113 and while the first wireless data connection is established. In some instances, the historical transaction/usage information may be stored in internal memory of identity management and recommendation computing platform 110, and/or external memory.

At step 228, identity management and recommendation computing platform 110 may configure and/or otherwise train a machine learning model (e.g., via machine learning engine **112*d*) based on the data received at step 219. In some instances, to configure and/or otherwise train the machine learning model, identity management and recommendation computing platform 110 may process all (or a subset) of the data received at step 227 by applying natural language processing and/or other processing techniques/algorithms to generate and store one or more classification models. For example, in configuring and/or otherwise training the machine learning model, identity management and recommendation computing platform 110** may apply natural language processing to the historical transaction/usage information to identify keywords in the prior transaction processing requests to group the prior transaction processing requests based on those identified keywords.

Additionally or alternatively, in configuring and training the machine learning model, identity management and recommendation computing platform 110 may also analyze the historical transaction/usage information for past user transactions to determine next steps or further action that may be taken. For example, based on a user's past transactions associated with usage of an account or a portfolio of accounts, identity management and recommendation computing platform 110 may instruct the machine learning model to automatically recommend next steps or further action that may be taken, connect the user to support or advisory services (e.g., which bank to go to and what application to fill out), and/or the like. Additionally or alternatively, identity management and recommendation computing platform 110 may give the machine learning model this instruction based on the user's past transactions.

Figure 2H:
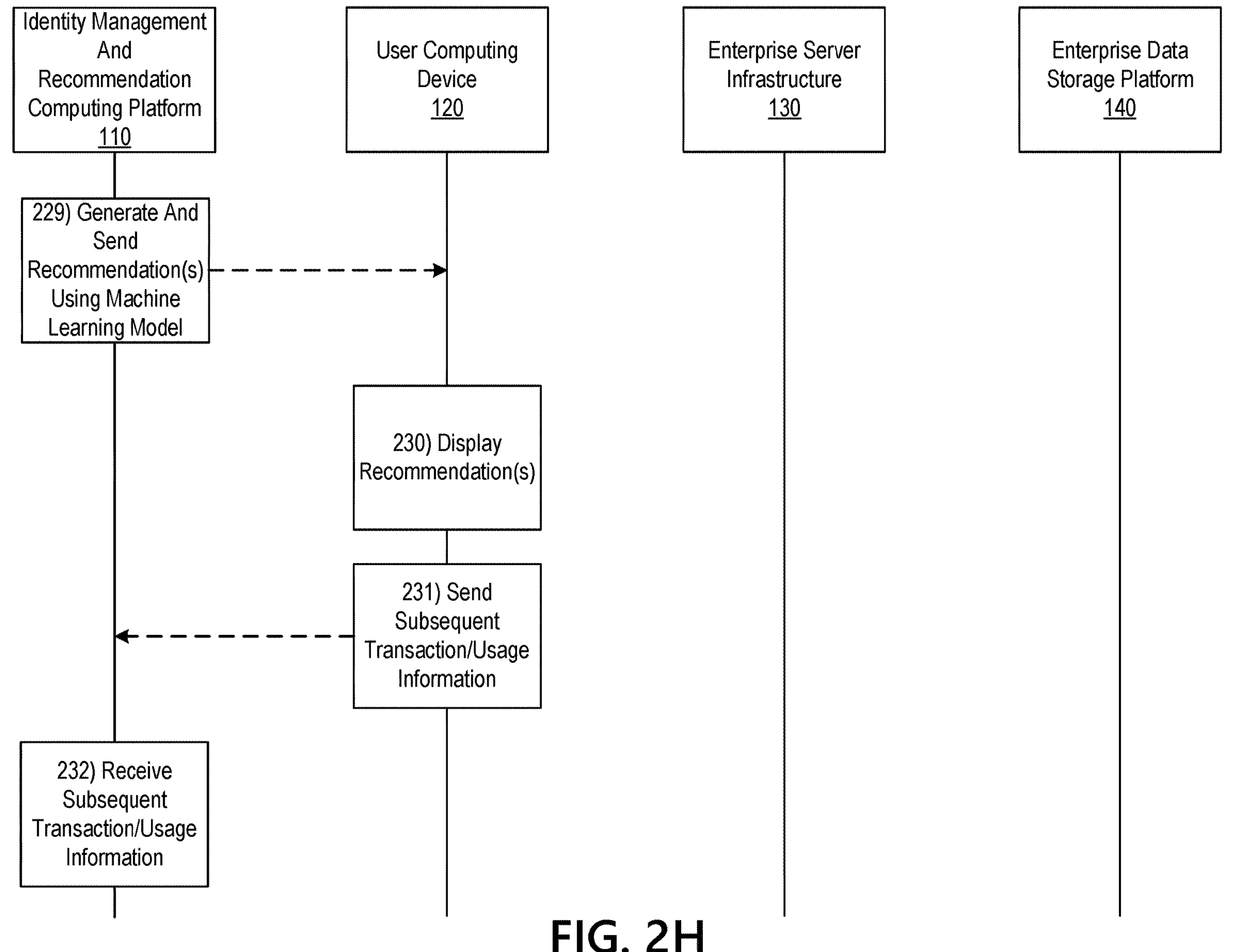

Referring to FIG. 2H, at step 229, based on the trained machine learning model, identity management and recommendation computing platform 110 may generate one or more recommendations associated with the transaction/usage, and send, via the communication interface (e.g., communication interface 113), the one or more recommendations to the user computing device (e.g., user computing device 120). In generating the one or more recommendations associated with the transaction/usage, identity management and recommendation computing platform 110 may, for example, provide a recommendation for a particular banking service center for additional help, provide a recommendation of applications or forms to fill out, provide a recommendation for affiliate support services, provide the user with suggestions on next steps or further action that may be taken, and/or the like while the first wireless data connection is established. In some examples, the one or more recommendations may be provided in a user preferred language.

At step 230, identity management and recommendation computing platform 110 may cause the user computing devices 120 to display the one or more recommendations. For example, identity management and recommendation computing platform 110 may cause the user computing device (e.g., user computing device 120) to display and/or otherwise present one or more graphical user interfaces similar to graphical user interface 400, which is illustrated in FIG. 4. As seen in FIG. 4, graphical user interface 400 may include text and/or other information associated with providing intelligent personalized recommendations (e.g., "Welcome to your personalized recommendation service. Based on your transaction history, may we recommend: [Banking service center . . . ] [Applications/Forms . . . ] [Affiliate support services . . . ] [Next steps . . . ]"). It will be appreciated that other and/or different notifications may also be provided.

At steps 231 to 232, identity management and recommendation computing platform 110 may monitor subsequent transaction and usage information associated with one or more user accounts (e.g., one or more accounts associated with the user of user computing device 120). For example, at step 231, user computing device 120 may send subsequent transaction/usage information to identity management and recommendation computing platform 110. For example, user computing device 120 may send subsequent transaction and usage information to identity management and recommendation computing platform 110 while the first wireless data connection is established.

At step 232, identity management and recommendation computing platform 110 may receive the subsequent transaction/usage information from user computing device 120. For example, identity management and recommendation computing platform 110 may receive the subsequent transaction/usage information via the communication interface 113 and while the first wireless data connection is established. In some instances, the subsequent transaction/usage information may be stored in internal memory of identity management and recommendation computing platform 110, and/or external memory.

Figure 2I:
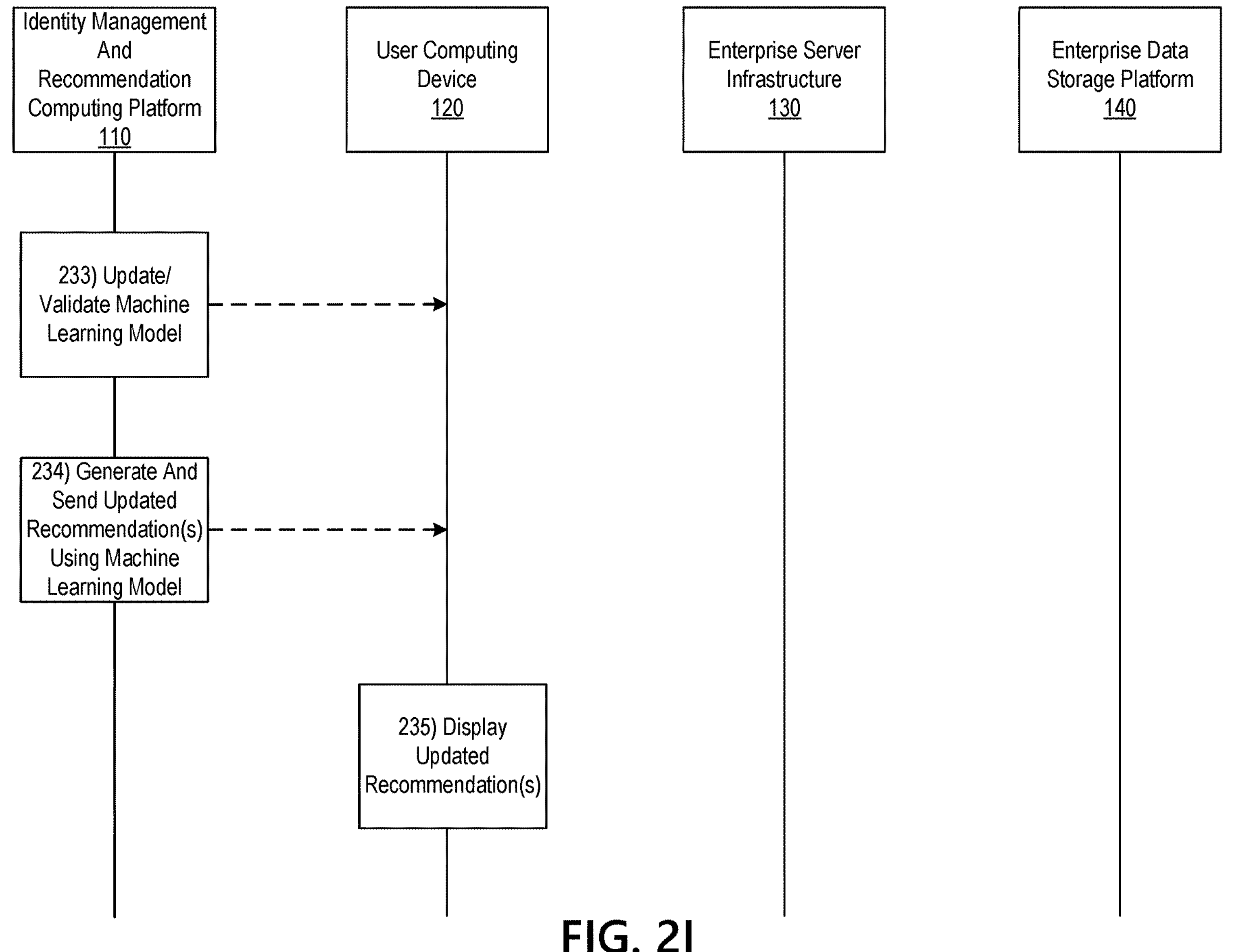

Referring to FIG. 2I, at step 233, identity management and recommendation computing platform 110 may update and/or validate the machine learning model (e.g., via machine learning engine 112*d*) based on the subsequent data received at step 232. In turn, at step 234, based on the updated/validated machine learning model, identity management and recommendation computing platform 110 may generate one or more updated recommendations associated with the transaction/usage, and send, via the communication interface (e.g., communication interface 113), the one or more updated recommendations to the user computing device (e.g., user computing device 120). At step 235, identity management and recommendation computing platform 110 may cause the user computing device (e.g., user computing device 120) to display the updated one or more recommendations.

Figure 5:
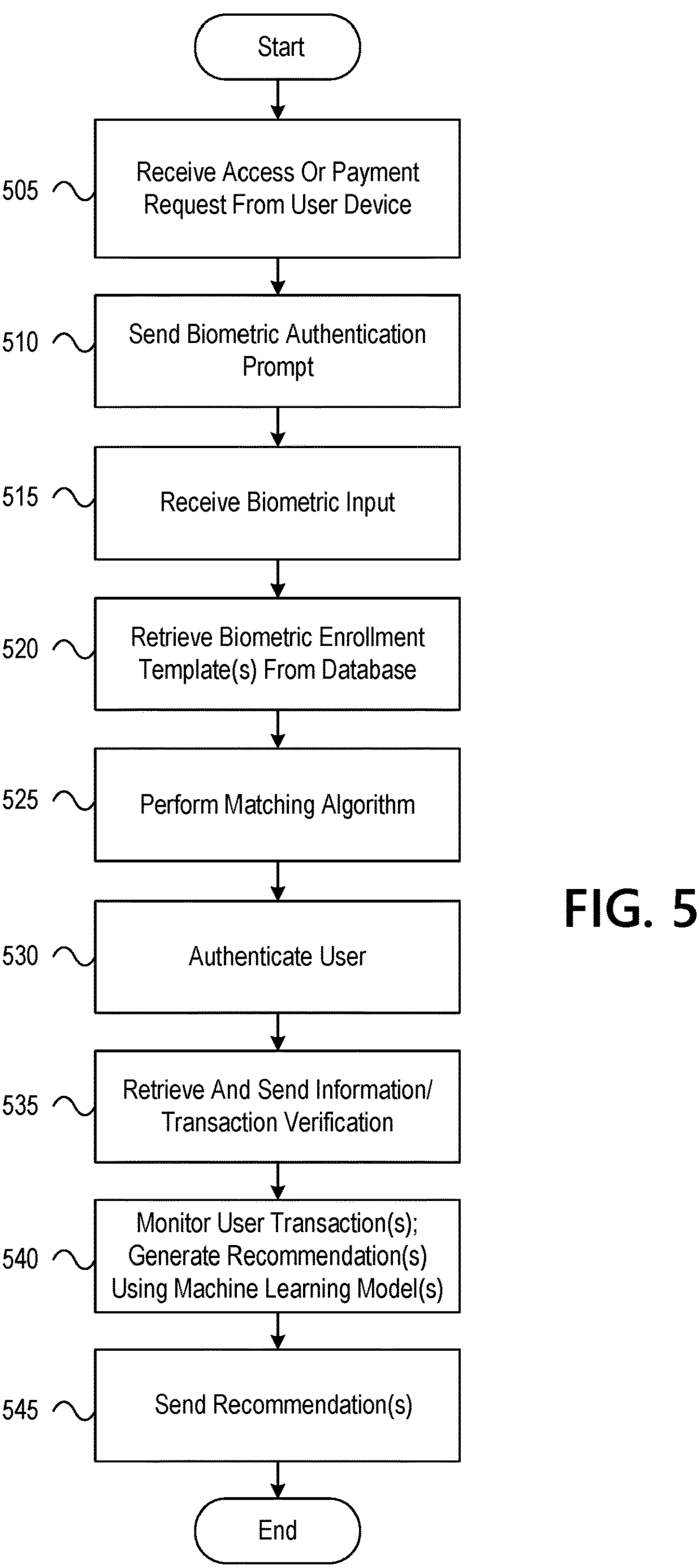
FIG. 5 depicts an illustrative method for identity management and intelligent recommendation in accordance with one or more example embodiments.

FIG. 5 depicts an illustrative method for identity management and intelligent recommendation in accordance with one or more example embodiments. Referring to FIG. 5, at step 505, a computing platform having at least one processor, a communication interface, and memory may, receive an account access or payment request from a computing device. At step 510, the computing platform may send a biometric authentication prompt to the computing device for identifying a user of the computing device. At step 515, the computing platform may receive, from the computing device, biometric input of the user. At step 520, the computing platform may retrieve one or more biometric enrollment templates from a database. At step 525, the computing platform may compare the biometric input to the one or more biometric enrollment templates to determine if a match exists between the biometric input and one of the one or more biometric enrollment templates. At step 530, the computing platform may authenticate the user based upon a match of the biometric input and one of the one or more biometric enrollment templates. At step 535, responsive to the user being authenticated using the biometric input, the computing platform may retrieve and send information associated with the one or more user accounts to the computing device or verify a payment transaction. At step 540, the computing platform may generate, using a machine learning model, one or more recommendations associated with usage of the one or more user accounts. At step 545, the computing platform may send the one or more recommendations to the computing device.

The aspects described herein may be used with transactions or requests via mobile device, via self-service kiosk, via point of sale device, via customer service or financial institution representative, or the like. In some arrangements, a user might not need to carry a card, a phone, or identification documents in order to establish an account or access funds. For instance, an ATM or other self-service kiosk might have biometric authentication capabilities (e.g., with one or more integrated biometrics capture devices such as a fingerprint scanner, a face scanner, an iris scanner, a palm scanner, and/or a vein scanner) that facilitate the use of biometrics for payment authentication, providing access to one or more accounts or banking functions, or the like.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:

at least one processor;

a communication interface communicatively coupled to the at least one processor; and memory storing computer-readable instructions that, when executed by the at least one processor, cause the computing platform to:

register a plurality of biometric enrollment templates including at least a first biometric configuration and a second, alternative biometric configuration based on configuration information received from a computing device during enrollment by a user, wherein the second, alternative biometric configuration is indicative that the user would be under duress when subsequently detected and wherein the second, alternative biometric configuration includes a sequence of physical actions indicating duress;

receive, via the communication interface, from the computing device associated with the user, a request to gain access to one or more accounts associated with the user;

send, via the communication interface, to the computing device associated with the user, a biometric authentication prompt for identifying the user of the computing device, wherein sending the biometric authentication prompt causes the computing device associated with the user to display the biometric authentication prompt;

receive, from the computing device, physical movement data of the user captured by a biometric sensor of the computing device, wherein the physical movement data represents a biometric input of the user and includes a plurality of physical movements captured by the biometric sensor of the computing device;

process the physical movement data of the user to determine whether the plurality of physical movements includes the sequence of physical actions indicating duress;

responsive to detecting that the plurality of physical movements includes the sequence of physical actions indicating duress:

identify that the user is under duress; and trigger a response action including at least one of: terminating the request to gain access to the one or more accounts associated with the user, freezing the one or more accounts associated with the user or dialing emergency services;

responsive to detecting that the plurality of physical movements does not include the sequence of physical actions indicating duress:

retrieve the plurality of biometric enrollment templates from a database;

compare, by executing a matching algorithm, the biometric input of the user to the plurality of biometric enrollment templates to determine if a match exists between the biometric input of the user and one of the plurality of biometric enrollment templates;

authenticate, based upon a match of the biometric input and one of the plurality of biometric enrollment templates, the user to all accounts of the one or more accounts associated with the user, without requiring the user to provide additional access credentials beyond the biometric input;

responsive to the user being authenticated using the biometric input, generate and send, using a machine learning model and based on transaction history of the user during a data connection with the computing device, one or more personalized recommendations related to the one or more accounts associated with the user, wherein generating the one or more personalized recommendations includes suggesting resources for further action that may be taken by the user;

cause the computing device to display, on a user interface, the one or more personalized recommendations related to the one or more accounts associated with the user;

responsive to using the machine learning model, receive subsequent transaction information from the computing device of the user during the data connection;

apply the subsequent transaction information to the machine learning model;

responsive to the applying, validate the machine learning model; and generate, by the validated machine learning model, an updated recommendation for the computing device.

2. The computing platform of claim 1, wherein registering the plurality of biometric enrollment templates includes, for each biometric enrollment template:

receiving, via the communication interface, biometric enrollment data of the user captured by the biometric sensor;

generating a biometric enrollment template based on the biometric enrollment data; and transmitting the biometric enrollment template for storage in association with one or more accounts associated with the user.

3. The computing platform of claim 2, further comprising:

based on receiving the biometric enrollment data of the user, register an account for the user without requiring the user to provide additional identifying information, wherein the account is a bank account at a financial institution.

4. The computing platform of claim 1, further including instructions that, when executed, cause the computing platform to retrieve information associated with the one or more accounts associated with the user including transmitting a user identity verification to an enterprise server and retrieving the information associated with the one or more accounts from the enterprise server.

5. The computing platform of claim 1, wherein the one or more accounts associated with the user comprises an account for which the user is an authorized co-user.

6. The computing platform of claim 1, wherein the biometric authentication prompt is configured to prompt the user of a mobile device to provide the biometric input via the biometric sensor integrated into the mobile device.

7. The computing platform of claim 1, wherein receiving the biometric input of the user comprises receiving hand-related features or head-related features of the user.

8. The computing platform of claim 1, wherein the memory stores additional computer-readable instructions that, when executed by the at least one processor, cause the computing platform to:

receive, via the biometric sensor of the computing device, a second biometric input of the user to initiate a payment transaction associated with one or more accounts associated with the user;

compare the second biometric input of the user to the plurality of biometric enrollment templates to determine if a match exists between the second biometric input of the user and one of the plurality of biometric enrollment templates;

authenticate, based upon a match of the second biometric input and one of the plurality of biometric enrollment templates, the user to all accounts of the one or more accounts associated with the user; and responsive to the user being authenticated using the second biometric input, transmit a notification comprising a transaction verification to an enterprise server.

9. The computing platform of claim 1, wherein terminating the request to gain access to the one or more accounts associated with the user further includes sending one or more alert messages to an enterprise server.

10. The computing platform of claim 1, further including instructions that, when executed, cause the computing platform to:

train the machine learning model by:

receiving historical transaction and usage information associated with one or more accounts;

apply natural language processing to the historical transaction and usage information to identify keywords; and group the historical transaction and usage information based on the keywords to generate a classification model.

11. A method, comprising:

at a computing platform comprising at least one processor, a communication interface, and memory:

registering, by the at least one processor, a plurality of biometric enrollment templates including at least a first biometric configuration and a second, alternative biometric configuration based on configuration information received from a computing device during enrollment by a user, wherein the second, alternative biometric configuration is indicative that the user would be under duress when subsequently detected and wherein the second, alternative biometric configuration includes a sequence of physical actions indicating duress;

receiving, by the at least one processor, via the communication interface, from the computing device associated with the user, a request to gain access to one or more accounts associated with the user;

sending, by the at least one processor, via the communication interface, to the computing device associated with the user, a biometric authentication prompt for identifying the user of the computing device, wherein sending the biometric authentication prompt causes the computing device associated with the user to display the biometric authentication prompt;

receiving, by the at least one processor, and from the computing device, physical movement data of the user captured by a biometric sensor of the computing device, wherein the physical movement data represents a biometric input of the user and includes a plurality of physical movements captured by the biometric sensor of the computing device;

process the physical movement data of the user to determine whether the plurality of physical movements includes the sequence of physical actions indicating duress;

responsive to detecting that the plurality of physical movements includes the sequence of physical actions indicating duress:

identify that the user is under duress; and trigger a response action including at least one of: terminating the request to gain access to the one or more accounts associated with the user, freezing the one or more accounts associated with the user or dialing emergency services;

responsive to detecting that the plurality of physical movements does not match the sequence of physical actions indicating duress:

retrieving, by the at least one processor, the plurality of biometric enrollment templates from a database;

comparing, by the at least one processor and by executing a matching algorithm, the biometric input of the user to the plurality of biometric enrollment templates to determine if a match exists between the biometric input of the user and one of the plurality of biometric enrollment templates;

authenticating, by the at least one processor, based upon a match of the biometric input and one of the plurality of biometric enrollment templates, the user to all accounts of the one or more accounts associated with the user, without requiring the user to provide additional access credentials beyond the biometric input;

responsive to the user being authenticated using the biometric input, generating and sending, by the at least one processor, using a machine learning model and based on transaction history of the user during a data connection with the computing device, one or more personalized recommendations related to the one or more accounts associated with the user, wherein generating the one or more personalized recommendations includes suggesting resources for further action that may be taken by the user;

causing the computing device to display, on a user interface, the one or more personalized recommendations related to the one or more accounts associated with the user;

responsive to using the machine learning model, receiving subsequent transaction information from the computing device of the user during the data connection;

applying the subsequent transaction information to the machine learning model;

responsive to the applying, validating the machine learning model; and generating, by the validated machine learning model, an updated recommendation for the computing device.

12. The method of claim 11, wherein registering the plurality of biometric enrollment templates includes, for each biometric enrollment template:

receiving, by the at least one processor, via the communication interface, biometric enrollment data of the user captured by the biometric sensor;

generating, by the at least one processor, a biometric enrollment template based on the biometric enrollment data; and transmitting, by the at least one processor, the biometric enrollment template for storage in association with one or more accounts associated with the user.

13. The method of claim 12, further comprising:

based on receiving the biometric enrollment data of the user, registering, by the at least one processor, an account for the user without requiring the user to provide additional identifying information, wherein the account is a bank account at a financial institution.

14. The method of claim 11, further including:

retrieving information associated with the one or more accounts associated with the user including transmitting a user identity verification to an enterprise server and retrieving the information associated with the one or more accounts from the enterprise server.

15. The method of claim 11, wherein the one or more accounts associated with the user comprises an account for which the user is an authorized co-user.

16. The method of claim 11, wherein the biometric authentication prompt is configured to prompt the user of a mobile device to provide the biometric input via the biometric sensor integrated into the mobile device.

17. The method of claim 11, wherein receiving the biometric input of the user comprises receiving hand-related features or head-related features of the user.

18. The method of claim 11, further comprising:

receiving, by the at least one processor, via the biometric sensor of the computing device, a second biometric input of the user to initiate a payment transaction associated with one or more accounts associated with the user;

comparing, by the at least one processor, the second biometric input of the user to the plurality of biometric enrollment templates to determine if a match exists between the second biometric input of the user and one of the plurality of biometric enrollment templates;

authenticating, by the at least one processor, based upon a match of the second biometric input and one of the plurality of biometric enrollment templates, the user to all accounts of the one or more accounts associated with the user; and responsive to the user being authenticated using the second biometric input, transmitting, by the at least one processor, a notification comprising a transaction verification to an enterprise server.

19. One or more non-transitory computer-readable media storing instructions that, when executed by a computing platform comprising at least one processor, a communication interface, and memory, cause the computing platform to:

register a plurality of biometric enrollment templates including at least a first biometric configuration and a second, alternative biometric configuration based on configuration information received from a computing device during enrollment by a user, wherein the second, alternative biometric configuration is indicative that the user would be under duress when subsequently detected and wherein the second, alternative biometric configuration includes a sequence of physical actions indicating duress;

receive, via the communication interface, from the computing device associated with the user, a request to gain access to one or more accounts associated with the user;

send, via the communication interface, to the computing device associated with the user, a biometric authentication prompt for identifying the user of the computing device, wherein sending the biometric authentication prompt causes the computing device associated with the user to display the biometric authentication prompt;

receive, from the computing device, physical movement data of the user captured by a biometric sensor of the computing device, wherein the physical movement data represents a biometric input of the user and includes a plurality of physical movements captured by the biometric sensor of the computing device;

process the physical movement data of the user to determine whether the plurality of physical movements includes the sequence of physical actions indicating duress;

responsive to detecting that the plurality of physical movements includes the sequence of physical actions indicating duress:

identify that the user is under duress; and trigger a response action including at least one of: terminating the request to gain access to the one or more accounts associated with the user, freezing the one or more accounts associated with the user or dialing emergency services;

responsive to detecting that the plurality of physical movements does not include the sequence of physical actions indicating duress:

retrieve the plurality of biometric enrollment templates from a database;

compare, by executing a matching algorithm, the biometric input of the user to the plurality of biometric enrollment templates to determine if a match exists between the biometric input of the user and one of the plurality of biometric enrollment templates;

authenticate, based upon a match of the biometric input and one of the plurality of biometric enrollment templates, the user to all accounts of the one or more accounts associated with the user, without requiring the user to provide additional access credentials beyond the biometric input;

responsive to the user being authenticated using the biometric input, generate and send, using a machine learning model and based on transaction history of the user during a data connection with the computing device, one or more personalized recommendations related to the one or more accounts associated with the user, wherein generating the one or more personalized recommendations includes suggesting resources for further action that may be taken by the user;

cause the computing device to display, on a user interface, the one or more personalized recommendations related to the one or more accounts associated with the user;

responsive to using the machine learning model, receive subsequent transaction information from the computing device of the user during the data connection;

apply the subsequent transaction information to the machine learning model;

responsive to the applying, validate the machine learning model; and generate, by the validated machine learning model, an updated recommendation for the computing device.

* * * * *